June 9, 1959 K. A. BROWNE 2,889,785
ROAD-RAIL VEHICLE

Filed Nov. 23, 1955 7 Sheets-Sheet 1

INVENTOR.
KENNETH A. BROWNE
BY Hudson, Boughton,
Williams, David & Hoffmann
ATTORNEYS

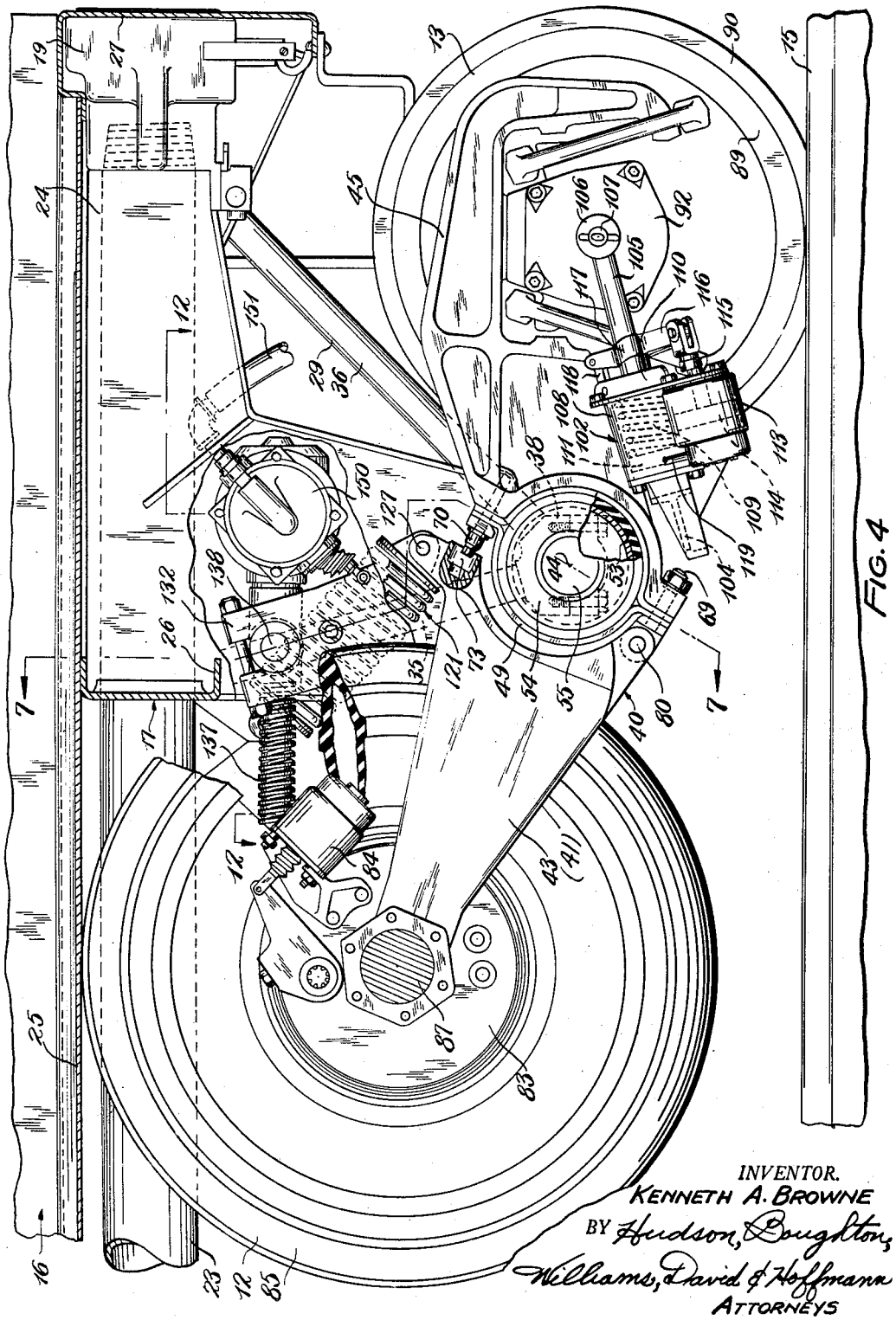

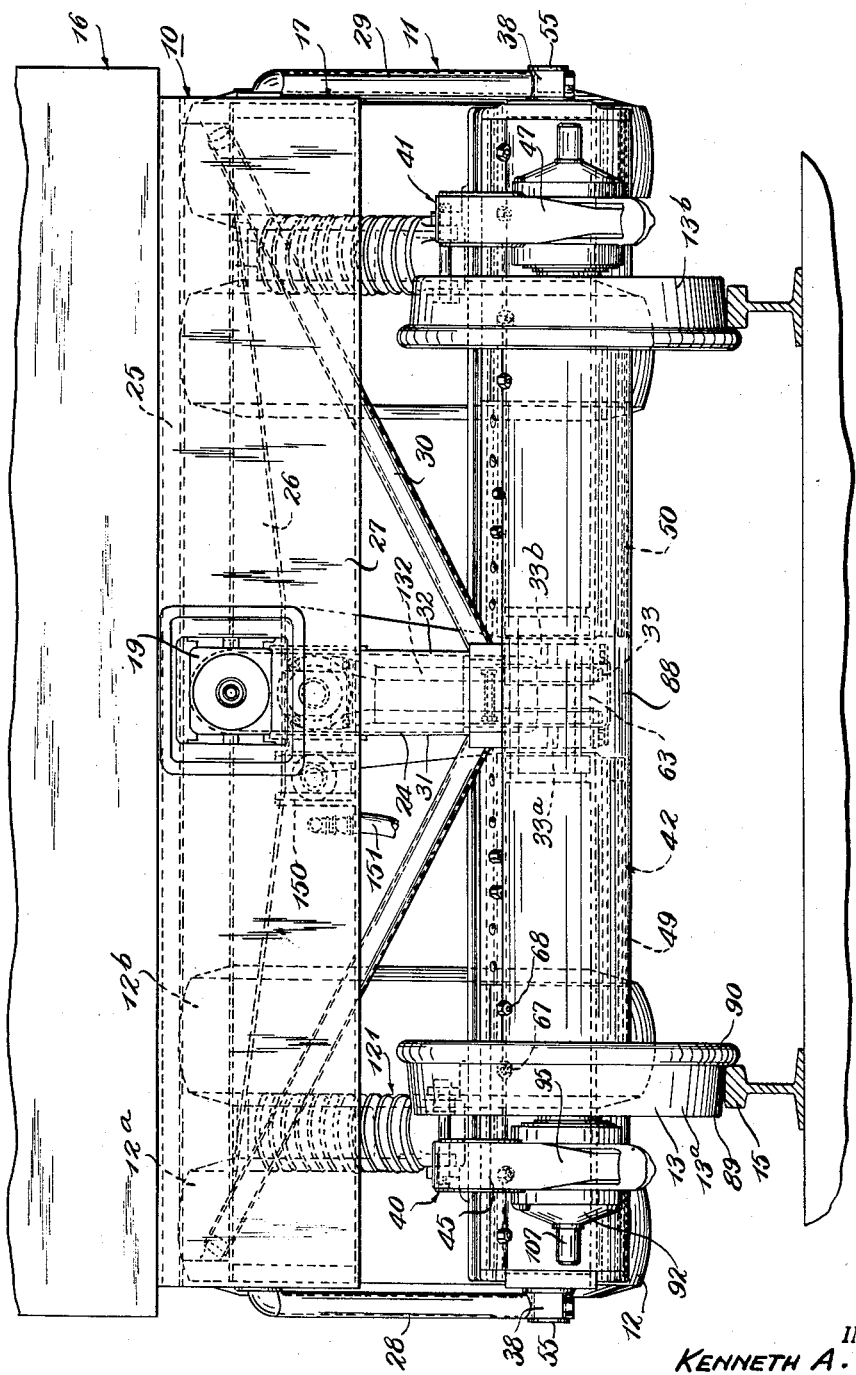

June 9, 1959  K. A. BROWNE  2,889,785
ROAD-RAIL VEHICLE
Filed Nov. 23, 1955  7 Sheets-Sheet 5

INVENTOR.
KENNETH A. BROWNE
BY Hudson, Doughton,
Williams, David & Hoffmann
ATTORNEYS

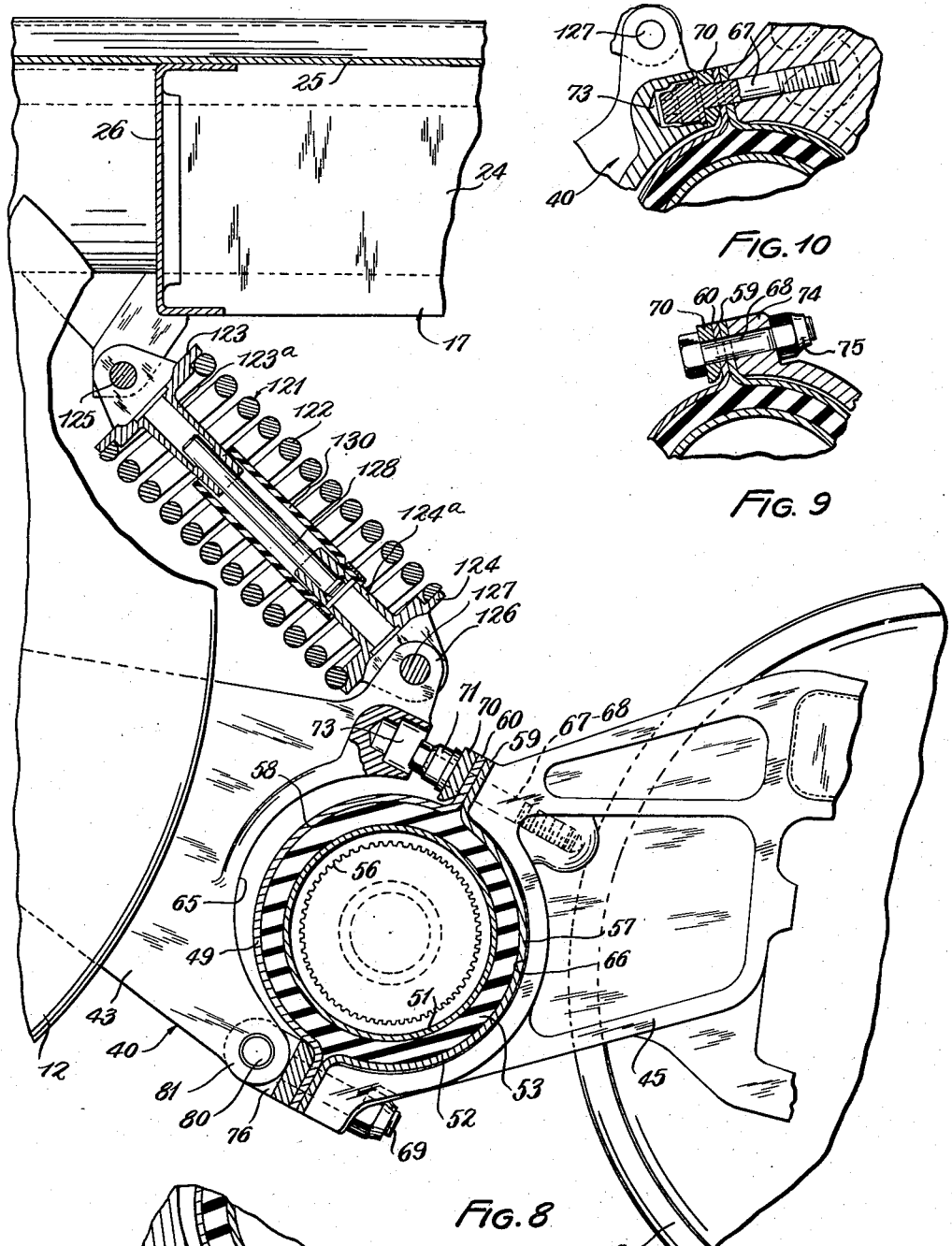

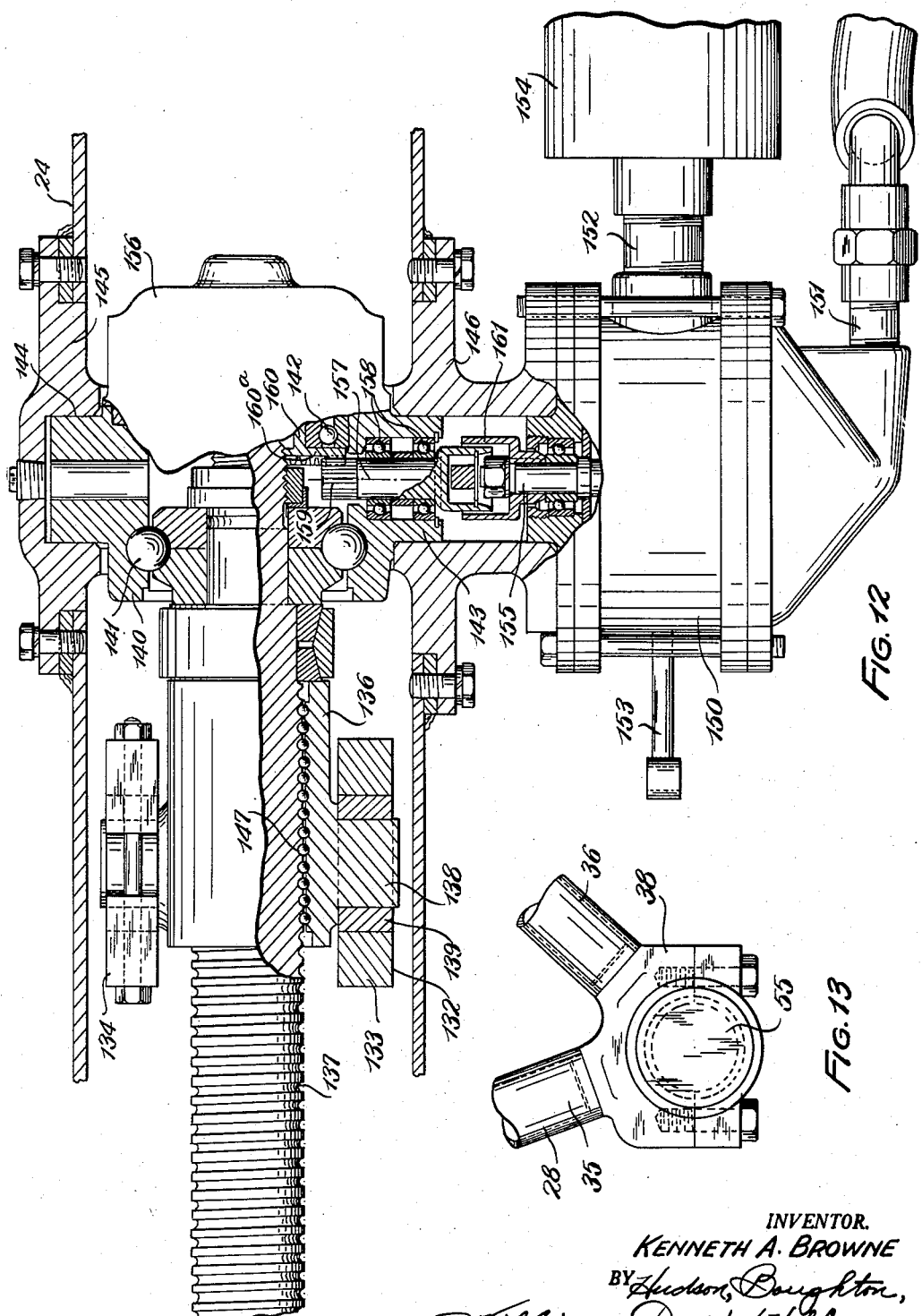

United States Patent Office 2,889,785
Patented June 9, 1959

2,889,785

ROAD-RAIL VEHICLE

Kenneth A. Browne, Lakewood, Ohio, assignor to The Chesapeake and Ohio Railway Company, Cleveland, Ohio, a corporation of Virginia Application November 23, 1955, Serial No. 548,602

20 Claims. (Cl. 105—215)

This invention relates to vehicles of the kind adapted to travel either on pavements or on railway rails and, more particularly, to a novel wheel suspension unit having road wheels and rail wheels adapted to be selectively brought into a load-carrying position.

An object of the invention is to provide a road-rail vehicle having selectively usable sets of road wheels and rail wheels, and novel means for moving the sets of wheels to and from a load-carrying position.

Another object is to provide such a road-rail vehicle in which the selectively usable sets of road wheels and rail wheels are connected by a spring means with a frame structure constituting a sprung portion of the vehicle, and in which shifting of the sets of wheels to and from a load position in engagement with a traction surface is accomplished by movement transmitted through the spring means.

A further object is to provide a road-rail vehicle of the character mentioned in which the sets of road wheels and rail wheels are on swingable wheel mounts actuatable through a transverse shaft means.

Still another object is to provide a road-rail vehicle of the above-mentioned character in which the swingable wheel mounts are connected with the frame structure by torsion spring means embodied in, or constituting, the shaft means through which the wheel mounts are actuated.

It is also an object of this invention to provide a road-rail vehicle of the character mentioned above in which the wheel mounts comprise road wheel supports and rail wheel supports projecting from opposite sides of a torsion spring means, and in which actuating mechanism on the vehicle causes swinging of the wheel mounts for shifting from one set of wheels to the other by torsional movement transmitted through the torsion spring means.

Yet another object is to provide such a road-rail vehicle in which the wheel supports for one set of the load wheels are swingable relative to the wheel supports for the other set of load wheels, so as to permit variation in the angular relation between the supports for the respective sets of wheels during shifting from one set of load wheels to the other.

This invention also provides vehicle construction of the above-mentioned dual-purpose character adapted for operation of the vehicles individually on a road or pavement and including coupler means for connection of the vehicles into a train for operation on a railroad track, and in which the angular variation between the road wheel supports and the rail wheel supports provides for a relatively lowered coupler height for increased stability of the train-connected vehicles in negotiating curves in the track.

As a still further object thereof, this invention provides such a road-rail vehicle in which spring means disposed between the frame structure and the wheel mounts resists the relative swinging between the road wheel supports and the rail wheel supports.

Another object is to provide a road-rail vehicle of the character indicated above in which the road wheel supports and the rail wheel supports have connected complemental end portions embracing the torsion spring means, and in which the road wheel supports are connected with the torsion spring means by eccentric hinge means for the relative swinging of the latter wheel supports.

As still another object this invention provides a road-rail vehicle in which the torsion spring means comprises substantially laterally aligned torsion spring devices, and in which the road and rail wheels on each side of the vehicle are connected with the frame structure through one of the torsion spring devices, such that the road and rail wheels on one side are springably movable independently of the springable movement of the road and rail wheels on the other side.

Additionally, this invention provides a road-rail vehicle of the kind mentioned above in which the means for swinging the wheel mounts in shifting from road wheel use to rail wheel use, or vice versa, includes a lever connected with the wheel mounts through the transverse shaft means, and in which actuating mechanism for the lever comprises trunnioned cooperating screw and nut members.

Other objects and advantages of this invention will be apparent in the following detailed specification and in the accompanying sheets of drawings forming a part thereof and in which:

Fig. 4 is a similar side elevation showing the wheel suspension unit in the same relative position as in Fig. 2 but on a larger scale;

Fig. 6 is a rear elevation of the vehicle with the body thereof broken away;

Fig. 8 is a fragmentary vertical section taken transversely of the torsion spring means substantially as indicated by section line 8—8 of Fig. 5;

Figure 7:
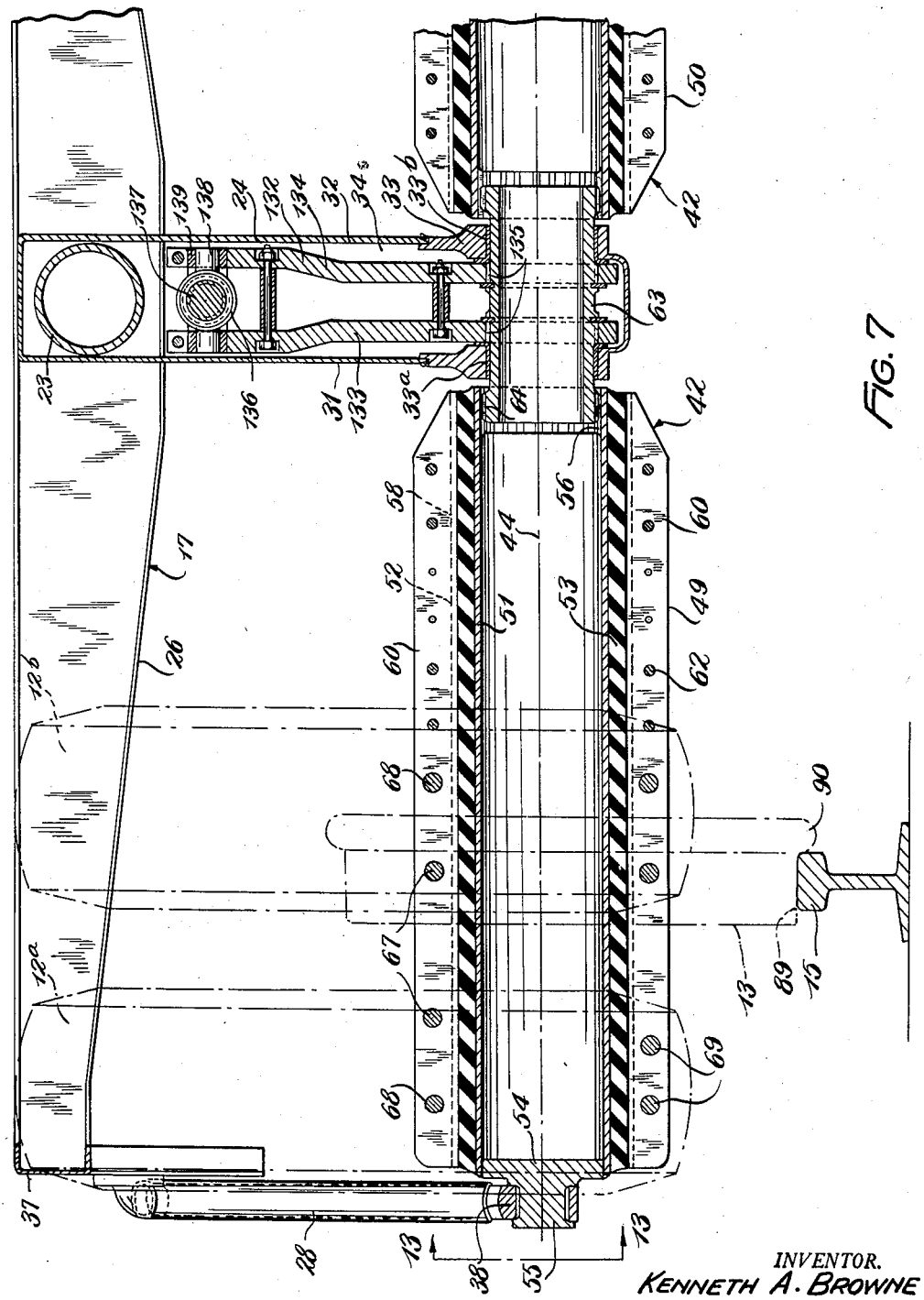
Fig. 7 is a partial vertical section taken transversely of the vehicle and through the torsion spring means substantially as indicated by section line 7—7 of Fig. 4.

Figs. 9, 10, and 11 are fragmentary sectional views corresponding with portions of Fig. 8 and further illustrating various constructional features of the wheel-suspension unit;

Fig. 12 is a plan view partially in section showing the wheel mount actuating mechanism when viewed approximately as indicated by directional line 12—12 of Fig. 4, and Fig. 13 is a fragmentary side elevation showing one of the frame support connections when viewed as indicated by directional line 13—13 of Fig. 7.

The present invention provides a road-rail vehicle 10 having a novel wheel suspension unit 11 equipped with a set of road wheels 12 and a set of rail wheels 13, which enable the vehicle to operate either on a road or pavement 14 or on the rails 15 of a conventional railroad.

The vehicle 10 is here shown as being a load vehicle having a van-type body 16 supported by a frame structure 17 to which the wheel suspension unit 11 is attached. As shown in the drawings, the wheel suspension unit 11 is located beneath the rear end portion of the frame structure 17. Front and rear couplers 18 and 19 are provided on the frame structure 17, such that a plurality of the vehicles 10 can be connected into a train for operation on the rails 15. The front end of the vehicle 10 is supported, either by the engagement of the front coupler 18 in a rear coupler 19 of the next-adjacent vehicle when the vehicles are in a train relationship, or by a suitable strut device 20 when individual vehicles 10 are disconnected from the train and are left standing in a parked relation.

The front end of the vehicle 10 can also be connected, by means of a king pin 21, with a road traction unit (not shown) when the vehicle is to be operated on a road or pavement as a van or truck. When the vehicle 10 is connected with such a traction unit, the front end of the vehicle is supported by the traction unit and the strut device 20 is then lifted to an ineffective position.

Figures 1, 2:
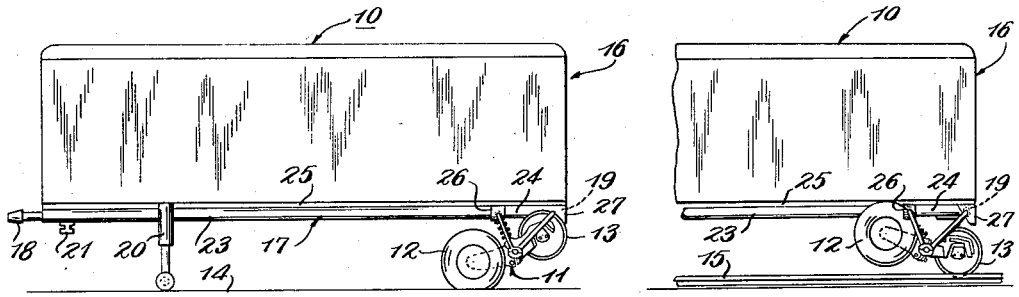
Fig. 1 is a side elevation of a road-rail vehicle embodying the present invention and showing the vehicle with the road wheels thereof in the load-supporting position.
Fig. 2 is a similar side elevation but showing the rail wheels in the load-supporting position.

Fig. 1 of the drawings shows the vehicle 10 with the road wheels 12 of the wheel suspension unit 11 in engagement with the pavement 14 and with the strut 20 in its lowered position for supporting the front end of the vehicle. This condition of the vehicle is a parked condition in which it is ready to have the traction unit connected to the front end thereof. Fig. 2 shows the vehicle 10 with the rail wheels 13 of the suspension unit 11 in engagement with the rails 15 and represents the condition of the vehicle when it is being operated on the railroad track either as an individual car or as one of a train of such cars.

The frame structure 17 can be of any suitable construction and is here shown as comprising a longitudinal center sill 23 having the front coupler 18 mounted on the front end thereof and whose rear end is connected with a hollow center bracket 24 in which the rear coupler 19 is located. The frame structure 17 also comprises suitably located transverse members which position the center sill 23 and support the floor 25 of the body 16. These transverse members include a pair of front and rear transverse members 26 and 27 to which the wheel suspension unit 11 is connected. The center sill 23 can be a beam or girder of any appropriate type of construction but it is preferably a tubular member, as here shown.

The frame structure 17 is connected with, and supported on, the wheel suspension unit 11 by the depending center bracket 24 and by depending side brackets 28 and 29 provided on opposite sides of the vehicle and located outwardly of the wheel suspension unit. The hollow center bracket 24 comprises laterally spaced depending plate members 31 and 32 and a bearing unit 33. The plate members 31 and 32 have upper portions thereof extending around the center sill 23 and have their lower portions suitably secured to upwardly extending arms of the bearing unit 33 such that the space between the plate members defines a chamber 34. The center bracket 24 is suitably braced, as by inclined struts 30 having their adjacent inner ends secured to the lower portion of this bracket and their outer ends secured to the frame structure 17.

The depending side brackets 28 and 29 are each formed by a pair of upwardly divergent struts 35 and 36, whose upper ends are suitably secured to side rails 37 of the frame structure 17 at longitudinally spaced points along such rails. The converging lower ends of the struts 35 and 36 are secured to a bearing member 38, whose purpose will be explained hereinafter. The wheel suspension unit 11 comprises a pair of laterally spaced wheel mounts 40 and 41 having the sets of road and rail wheels 12 and 13 mounted thereon, and a transversely extending torsion spring means 42 through which the wheel mounts 40 and 41 are connected with the frame structure 17. The wheel mount 40 comprises a pair of wheel support arms consisting of a road wheel support or arm 43 located on one side of the torsion spring means 42 and projecting forwardly from the axis 44 of the latter, and a rail wheel support or arm 45 on the other side of the torsion spring means and projecting therefrom in a rearward direction away from the axis 44. The wheel mount 41 is identical in construction with the wheel mount 40 and also comprises a forwardly extending road wheel support or arm and a rearwardly extending rail wheel support or arm 47.

The torsion spring means 42 comprises two trans-aligned torsion spring devices 49 and 50 which are associated respectively with the wheel mounts 40 and 41. As will be further explained hereinafter, the torsion spring device 42 renders the wheel mount 40 springably movable relative to the frame structure 17 substantially independently of the wheel mount 41, and similarly, the torsion spring device 50 renders the wheel mount 41 springably movable relative to the frame structure 17 substantially independently of the wheel mount 40.

Since the torsion spring devices 49 and 50 are of an identical construction only one of these devices, for example the torsion spring device 49, need be described in detail. The torsion spring device 49 is in the form of a shaft means comprising inner and outer coaxial tubular members or shafts 51 and 52, and a resilient torque-transmitting medium in the form of a sleeve 53 of rubber, or the like, disposed between such inner and outer tubular members. The inner member or shaft 51 is provided at the outer end thereof with a closure plug 54 which is welded, or otherwise secured in place therein, and which carries an outwardly projecting coaxial journal 55. At the inner end thereof, the member 51 is provided with groups of internal spline teeth 56 by which an actuating connection is made with this inner member, as will be further explained hereinafter.

The outer tubular member or shaft 52 comprises a pair of complemental substantially semi-cylindrical sections 57 and 58 having pairs of substantially radially extending longitudinal edge flanges 59 and 60. The complemental sections 57 and 58 are secured together in a clamping relation around the resilient sleeve 53 by rows of clamping bolts 62 extending through the pairs of flanges 59 and 60. The resilient sleeve 53 serves to transmit torque, or resist the transmission of torque, between the inner and outer tubular members 51 and 52 when subjected to shear and, if desired, the surfaces of the sleeve 53 can be bonded to the adjacent surfaces of these inner and outer tubular members 51 and 52.

Reverting to the connection of the frame structure 17 with the torsion spring means 42, it can now be explained that the depending side brackets 28 and 29 have the bearings 38 of their lower ends supported on the outwardly projecting journals 55 of the torsion spring devices 49 and 50. The inner ends of the torsion spring devices 49 and 50 are located adjacent the bearing unit 33 of the center bracket 24. These inner ends of the torsion spring devices 49 and 50 have the center bracket supported thereon by means of a hollow coupling member 63 which is journalled in the bearing unit 33 and whose ends project outwardly from this bearing unit and extend into and support the hollow inner members 51 of the torsion spring devices. The outer ends of the coupling member 63 are provided with groups of external spline teeth 64 which are in meshed engagement with the above-mentioned internal spline teeth 56 of the torsion spring devices.

As has been indicated above, the wheel mounts 40 and 41 are of an identical construction and, therefore, only one of these wheel mounts, for example the wheel mount 40, need be described in detail. The wheel mount 40 comprising the above-mentioned pair of wheel support arms 43 and 45 is connected with the outer tubular member 52 of the torsion spring device 49. For this purpose, the road wheel arm 43 and the rail wheel arm 45 have complemental end portions which embrace the torsion spring device 49. The road wheel arm 43 has a recessed end portion 65 which lies adjacent or against the section 58 of the outer tubular member 52 and the rail wheel arm 45 has a recessed end portion 66 which lies against the section 57 of this outer tubular member.

The rail wheel arm 45 is secured in a fixed relation to the section 57 of the tubular outer member 52 of the torsion spring device 49 by an upper group of fastenings comprising studs 67 and bolts 68 and a lower group of fastenings comprising hinge bolts 69. As shown in Figs. 8 and 10, the studs 67 are mounted in the rail wheel arm 45 and project therefrom through the paired flanges 59 and 60 and through a clamping strip 70. Nuts 71 applied to the studs 67 exert pressure against the strip 70 for clamping the flanges 59 and 60 against the adjacent portion of the rail wheel arm 45.

Figure 5:
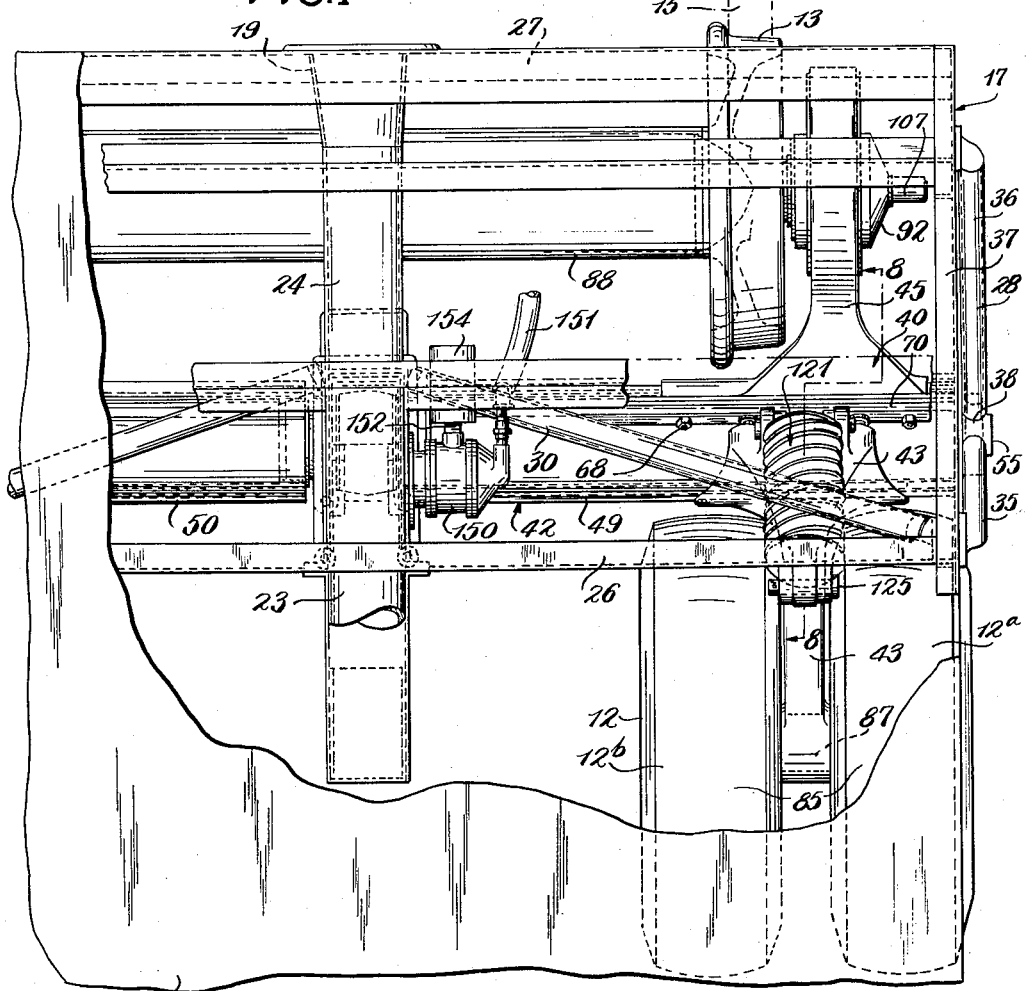
Fig. 5 is a partial plan view with a portion of the floor of the vehicle body broken away to expose the wheel suspension unit therebelow.
Figure 3:
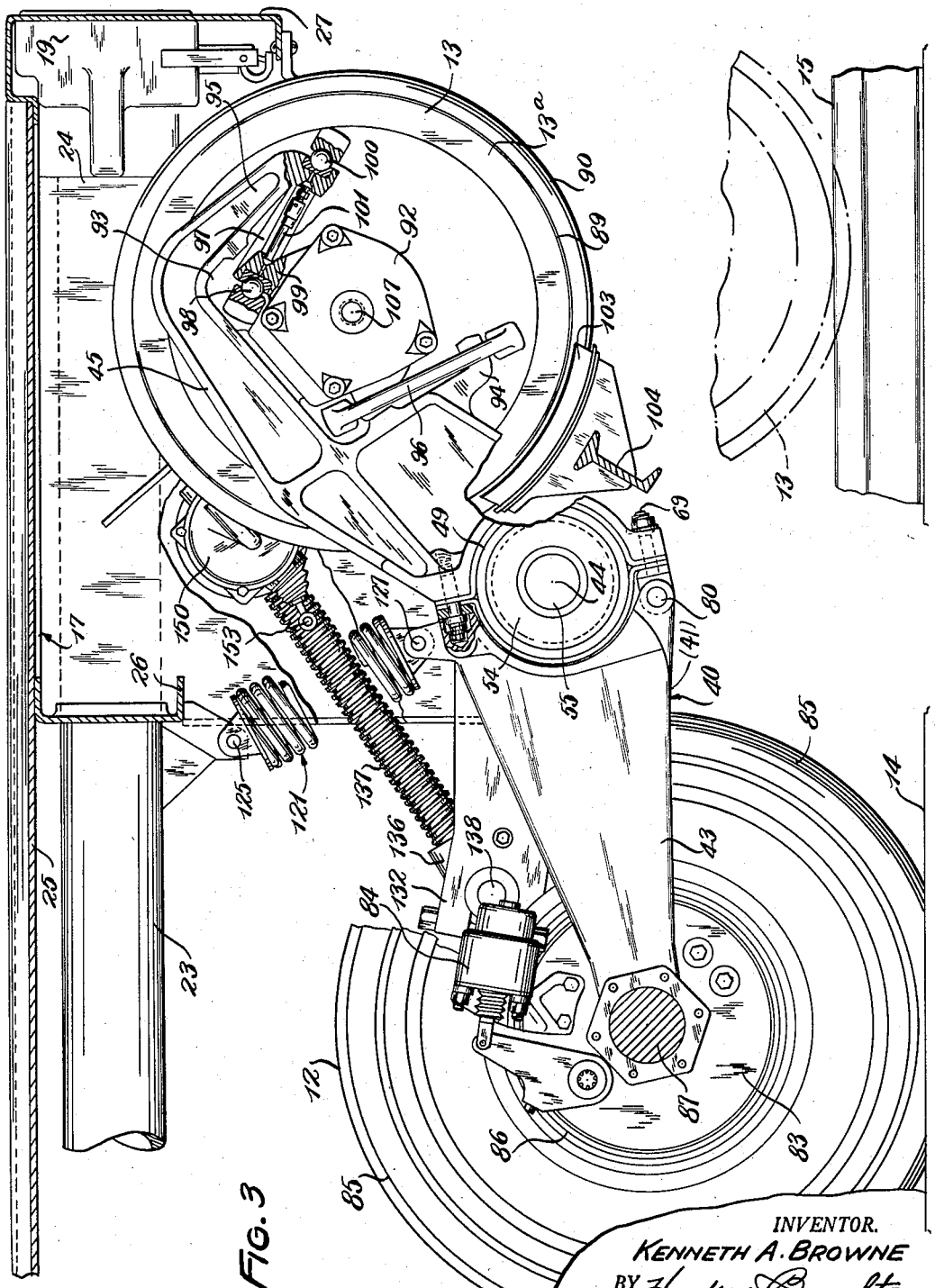
Fig. 3 is a side elevation, with portions broken away, showing the wheel suspension unit of the vehicle of Fig. 1 on a larger scale.

As shown in Figs. 5, 8 and 10, the studs 67 are located at a point substantially opposite the road wheel arm 43 and the nuts 71 extend into clearance recess 73, provided on the road wheel arm, when the latter lies against the spring device 49 as shown in Figs. 3 and 10. The clamping bolts 68 are provided in the torsion spring device 49 on axially opposite sides of the studs 67 and, as shown in Fig. 9, extend through the paired flanges 59 and 60 and through the clamping strip 70 as well as through flange portions 74 of the rail wheel arm 45. Nuts 75 applied to the bolts 68 hold the radial flanges 59 and 60 in a clamped relation between the clamping strip 70 and the arm portions 74.

As shown in Figs. 3, 8 and 11, the hinge bolts 69 have eye-shaped heads 76 thereon which engage a lower clamping strip 77 for applying clamping pressure to the paired flanges 59 and 60. The stems of the hinge bolts 69 extend through lower projections 78 of the rail wheel arm 45 and have nuts 79 applied thereto. The lower portion of the road wheel arm 43 is pivotally mounted on the hinge bolts 69 by means of pivot pins 80 mounted in yoke portions 81 which straddle the eye-shaped heads 76.

From the above-described connections between the wheel support arms 43 and 45 and the torsion spring device 49, it will be seen that the rail wheel arm 45 is rigidly secured to this spring device but the road wheel arm 43 is flexibly connected therewith by means of the hinge bolts 69. The flexible connection thus provided for the road wheel arm 43 permits the latter to have an opening swinging movement relative to the torsion spring device 49 by which the inner end or base portion of this arm is movable from a substantially closed condition, in which its recessed portion 65 seats against the tube section 58 as shown in Fig. 3, to the relatively open position in which the recessed section 65 is spaced away from the tube section 58, as shown in Figs. 4 and 8. The closed and open positions of the road wheel arm 43 represent different angular positions of this arm relative to the rail wheel arm 47, to which further reference will presently be made.

The road wheels 12 are of a conventional form and include brake drums rotatable relative to associated backing plates 83 supporting conventional internal brake mechanism actuated by a pneumatic or hydraulic brake cylinder 84. The road wheels 12 also include pneumatic tires 85 mounted on rim portions 86 and the set of road wheels preferably comprises pairs of dual wheels 12$^a$ and 12$^b$ in adjacent relation, with a pair of such dual wheels mounted on the road wheel arm of each of the wheel mounts 40 and 41. The pair of dual road wheels of the wheel mount 40 are mounted on the road wheel arm 46 by a suitable axial shaft 87.

The set of rail wheels 13 comprises a pair of laterally spaced wheels 13$^a$ and 13$^b$ which are rigidly connected by a transverse rail wheel axle 88. These rail wheels have peripheral rim and flange portions 89 and 90 which cooperate with the heads of the rails 15. The set of rail wheels 13 is rotatably mounted in the rail wheel arms 45 and 47 of the wheel mounts 40 and 41 by means of journals provided on the ends of the rail wheel axle 88 and which operate in suitable bearings located in journal boxes 92.

As shown in the drawings, the rail wheel arm 45 is provided adjacent the rear end thereof with a downwardly opening fork recess 93 defined by a pair of fork arms 94 and 95. The journal box 92 is located in the fork recess 93 and the fork arms 94 and 95 are hung on the journal box by pairs of outer suspension links 96 and 97. The upper ends of the links 96 and 97 are rockably seated on spherical bearings 98 which are supported by lug projections 99 of the journal box. The lower ends of the suspension links 96 and 97 support spherical bearings 100 on which the lower ends of the fork arms 94 and 95 are rockably seated. Inner suspension links in the form of adjustable expansion struts 101 are disposed between the underside of the lug projections 99 and the upper sides of the lower end portions of the fork arms 94 and 95. These struts take up lost motion in the linkage and prevent the journal box 92 from dropping out of the fork recess 93 when the rail wheels are in a relatively elevated position.

Brake mechanism 102 (see Fig. 4) is provided on the wheel mounts 40 and 41 for cooperation with the rail wheels 13 and includes conventional brake shoes 103 carried by a transversely extending brake beam 104 and are adapted to be pressed against the rims 89 of the rail wheels by such brake beam. The brake mechanism 102 also includes a plunger rod 105 having the outer end thereof provided with an eye 106 which is mounted on an anchor pin projection 107 of the journal box 92. A spring housing 108 is connected with the brake beam 104 and is axially shiftable on the plunger rod 105. A compression spring 109, located in the housing 108 and disposed between the housing cover 110 and a plunger 111 carried by the rod 105, is preloaded and normally reacts against the plunger 111 to shift the housing 108 toward the anchor pin 107 and thereby causes the brake beam 104 to press the brake shoes 103 against the rail wheels.

The brake mechanism 102 also includes a power cylinder device 113 having a piston 114 operable therein and carried by a piston rod 115. The outer end of the rod 115 is pivotally connected with a lever 116 which is fulcrumed on the relatively stationary plunger rod 105 by a pivot pin 117, such that swinging of this lever by a power stroke of the piston 114 will cause the inner end of the lever to transmit motion to the spring housing 108 through a connecting link 118. The direction of the movement thus imparted to the housing 108 is in opposition to the spring 109 and moves the brake beam 104 in a direction to release the braking force of the shoes 103 on the rail wheels 13. Fluid pressure, either pneumatic or hydraulic, is supplied to the cylinder 113 and exhausted therefrom through a conduit 119.

The design of the wheel suspension unit 11 is such that substantially the same torque load will be imposed on the resilient sleeve 53 of the torsion spring means 42, regardless of whether the vehicle load is being supported by the road wheels 12 or by the rail wheels 13. This is accomplished by selecting proper dimensions for the effective lever arm lengths of the road wheel and rail wheel arms 43 and 45 of the wheel mount 40. Such selection of the effective lever arm length for these wheel support arms must take into consideration the fact that when the vehicles 10 are coupled together in a train, the rail wheels of each suspension unit 11 carry substantially the full weight of one of the vehicles inasmuch as the set of rail wheels supports the rear end of one vehicle and also supports the front end of the next adjacent vehicle through the couplers. The road wheels 12 on the other hand support a load which is approximately equal to only one-half of the vehicle load because they support only the rear end of the vehicle while the front end is supported either by the strut device 20 or by the traction unit. In view of the factors just explained, the rail wheel arm 45 has a relatively shorter effective lever arm length than the road wheel arm 43.

Since the road wheels 12 have pneumatic tires 85 thereon and utilize internal brake mechanism housed in the brake drum of the wheel, road wheels of the minimum diameter available will still be substantially greater in diameter than the rail wheels 13. Because of this greater diameter of the road wheels and greater effective lever arm length of the road wheel arm 43, the upper segment of the road wheels will come into engagement with the underside of the floor 25 of the vehicle body 16, as shown in Fig. 4, when the road wheels are retracted or lifted from their load-carrying position.

In accordance with clearance diagrams promulgated by the Association of American Railroads and establishing the required clearance values for railway equipment, the road wheels 12 are required to be located inwardly of the sides of the wheel suspension unit 11 and, therefore, lie beneath the floor 25. The equipment clearance diagrams also require a predetermined extent of lifting of the road wheels 12, which results in the upper segment of the wheels coming into engagement with the floor 25 as mentioned above, particularly in view of the greater lever arm length of the road wheel arm 43.

The above-explained hinge connection provided for the road wheel arm 43 by the hinge bolts 69, permits the change in angularity between the arms 43 and 45 which enables the rail wheels 13 to be fully lowered into their load-carrying engagement with the rails 15, notwithstanding the engagement of the upper segment of the road wheels 12 with the floor 25. Thus during the swinging of the wheel mounts about the axis 44 for lowering the rail wheels from their elevated position of Fig. 3 to their rail-engaging load-carrying position of Fig. 4, the road wheels engage the floor 25 whereupon the hinge connection of the arm 43 permits swinging of the latter to the relatively open position shown in Fig. 4.

By reason of the provision of this hinge mounting for the road wheel arm 43, the coupler 19 can be at a relatively lower height above the track 15 than would be the case if the floor 25 were required to be at a sufficient height to accommodate road wheels carried by a rigidly connected road wheel arm. The relatively lower coupler height is important, particularly in connection with the railway use of the vehicle 10, because a lower coupler height contributes to greater stability of the vehicle and to a decreased tendency for the vehicle to be overturned by a side thrust component when the vehicle is negotiating a curve in the track.

It is desirable that the road wheel arm 43 return to its normal or relatively closed position during the lowering of the road wheels 12 from their elevated position of Fig. 4 to their pavement-engaging load-carrying position of Fig. 3. The closing movement of the road wheel arm 43 is obtained, in part, from the fact that the hinge pivot 80 is located below the axis 44 of the torsion spring means 42 and, in part, from a spring device 121 disposed between the frame structure 17 and the road wheel arm 43.

The spring device 121 comprises a preloaded compression spring 122 having its ends in engagement with upper and lower spring seats 123 and 124. The upper spring seat 123 is pivotally connected with the frame structure 17 by a pivot pin 125, and the lower spring seat 124 is pivotally connected with a lug 126 of the load wheel arm 43 by a pivot pin 127.

The spring seats 123 and 124 are maintained in an aligned relation by an aligning rod 128 located on the axis of the spring 122 and having its ends telescopingly engaged in hollow stem portions 123ª and 124ª of the spring seats. A flexible tubular dust shield 130 located in the spring device 121 and mounted on the hollow stems of the spring seats excludes dust, or the like, from the slidable aligning connection. The expansive action of the spring device 121 is effective on the road wheel arm 43 to move the latter to its relatively closed position shown in Fig. 3 whenever the wheel mount 40 is swung in a direction, and through a sufficient angular distance, to disengage the road wheels 12 from the floor 25 of the vehicle body 16.

The swinging of the wheel mounts 40 and 41 about the common axis 44 to shift from road wheel use to rail wheel use, or vice versa, is produced by rotational movement transmitted to the wheel mounts through the resilient sleeves 53 of the torsion spring devices 49 and 50. This rotational movement is imparted to the shaft members 51 of the torsion spring devices by a lever 132 located in the chamber 34 of the center bracket 24 and which lever is connected with the shaft members 51 by the coupling member 63. The lever 132 is here shown as comprising a pair of spaced arms 133 and 134 which are located between the bearings 33ª and 33ᵇ of the bearing unit 33 and are drivingly attached to the coupling member 63 by spline connections 135.

From the above-described construction and arrangement of the torsion spring devices 49 and 50, it will be understood that these devices constitute a transversely disposed shaft means with the outer tubular member 52 forming an outer rockshaft member and the inner tubular member 51 forming an inner rockshaft member. The frame structure 17, the vehicle body 16 and the load contained in the latter constitute the sprung load and the yielding character of the sleeve 53 provides the desired extent of flexing by which the sprung load is springably supported on the wheel suspension unit 11. The roackshaft members 51 are held relatively stationary by the lever 132 when the selected set of load wheels is in its load-carrying position.

The lever 132 is swingable in the chamber 34 in a substantially vertical plane by the action of a pair of cooperating nut and screw members 136 and 137 (see Fig. 12). The nut member 136 is provided with a pair of trunnions 138 which are rockable in bearings 139 mounted in the spaced arms 133 and 134 of the lever 132. The screw 137 is rotatably mounted in a swingable carrier 140 by means of antifriction bearings 141 and 142. The carrier 140 is provided with a pair of trunnions 143 which are rockable in aligned bearings formed by the walls of cylindrical openings 144 of plate members 145 and 146 of the center bracket 24. In this instance the thread engagement of the screw 137 in the nut 136 is provided by antifriction elements 147 located in the thread groove therebetween.

The rotation of the screw 137 in one direction in the carrier 140 will propel the nut 137 along the screw to cause swinging of the lever 132 in a direction to lower the road wheels 12, and rotation of the screw in the opposite direction will cause swinging of the lever 132 in a direction to raise the road wheels and lower the rail wheels 13. During the shifting of the vehicle load from the road wheels to the rail wheels, or vice versa, a relative rotation is produced between the shaft member 51 and the tubular member 52 which is of sufficient angular extent to not only bring the lowered wheels into engagement with their associated traction surface, but to also cause a torsional flexing of the sleeve 53 corresponding with the application of the full load of the vehicle to the lowered wheels. Similarly when the opposite set of load wheels is being lowered, the extent of relative angular movement between the shaft member 51 and the tubular member 52 is such as to first lower the other pair of load wheels into engagement with their associated traction surface and to then transfer the vehicle load to the latter wheels by a reverse torsional flexing of the sleeve 52, after which the continued rotational movement of the shaft member 51 causes lifting of the load wheels from which the vehicle load has just been removed.

The screw 137 is rotatably driven by a power delivery motor 150 provided on the vehicle 10 and mounted on the center bracket 24 by being attached to the plate member 146. The motor 150 can be of any desired form and is here shown as being a fluid pressure operated rotary motor to which compressed air, or other motive fluid, is supplied from a reservoir or pump through a conduit 151 and which motor is controlled by a control lever 153. The exhaust fluid from the motor 150 is discharged through an exhaust conduit 152 and a muffler 154.

The motor 150 has a rotatable power output shaft 155 located on the axis of the trunnion members 143 and which output shaft is drivingly connected with the screw 138 through suitable reduction gearing 160 located in the gear case 156 of the carrier 140 and a shaft member 157 rotatably supported in the adjacent trunnion 143 by antifriction bearings 158. The shaft member 157 is provided on the inner end thereof with a pinion 159 which is in meshed engagement with the input gear 160ª of the reduction gearing 160 and the outer end of this shaft member is connected with the output shaft 155 of the motor by a clutch 161. This clutch is of the type known as a "two-way no back" clutch which transmits torque to the gearing 156 in either direction but prevents torque from being transmitted to the motor 150 by the gearing. Thus by having the motor 150 drivingly connected with the screw 137 by shaft means located on the trunnion axis of the carrier 140, the motor can be mounted in a fixed relation on the vehicle and the power actuation of the screw 138 will take place freely and directly regardless of the different angular positions assumed by the screw.

From the accompanying drawings and the foregoing detailed description it will now be readily understood that this invention provides a road-rail vehicle having a novel wheel suspension unit equipped with road wheels and rail wheels which are selectively engageable with either a road surface or railway rails by swinging movement imparted to wheel mounts on which such road wheels and rail wheels are rotatably mounted. It will now also be seen that the wheel mounts are connected with the frame structure of the vehicle through torsion spring devices and that the swinging of the wheel mounts for shifting the vehicle load from one set of load wheels to the other is accomplished by a rockshaft movement transmitted through the torsion spring devices. It will now also be understood that by reason of the flexible connection provided between the road wheel arm and the rail wheel arm, the coupler height for railway operation of the vehicle can be maintained at a relatively small dimension through changes occurring in the angularity of the wheel support arms and resulting from engagement of the road wheels with a portion of the vehicle structure when the latter wheels are in their lifted position. Additionally, it will now be understood that by the provision of the cooperating screw and nut members a power device located on the vehicle and effective through the torsion spring means, produces the swinging of the wheel mounts whereby shifting from one set of load wheels to the other is quickly accomplished.

Although the road-rail vehicle of this invention has been illustrated and described herein to a somewhat detailed extent, it will be understood of course that the invention is not to be regarded as being limited correspondingly in scope but includes changes and modifications coming within the terms of the claims hereof.

Having thus described my invention, I claim:

1. In a wheel suspension for a road-rail vehicle, a frame structure having mounting portions spaced apart laterally in a direction transversely of the vehicle, transverse shaft means engaged by said mounting portions, tubular means substantially coaxial with said shaft means, a yieldable torsion medium between said tubular means and shaft means and resisting relative rotation therebetween, road wheel supports connected with and projecting from said tubular means on one side thereof, road wheels on said road wheel supports, rail wheel supports connected with and projecting from said tubular means on the other side thereof, rail wheels on said rail wheel supports, and actuating means connected with said shaft means for imparting rotation thereto for selectively lifting and lowering said wheels by torque transmitted through said torsion medium, said actuating means being also effective to prevent rotation of said shaft means for holding the selected wheels in their lowered position.

2. In a road-rail vehicle; a frame structure having laterally spaced depending side and center brackets; a pair of torsion spring devices extending transversely of the vehicle in a substantially laterally aligned relation; said torsion spring devices each comprising a tubular outer member, an inner shaft member extending substantially coaxially in said outer member and a yieldable torque-transmitting medium disposed between said tubular member and said shaft member; bearings on said side brackets and having the outer end portions of the shaft members journalled therein; bearing means on said center bracket; coupling means rockably journalled in said bearing means and having drive connection with the inner end portions of said shaft members; first wheel supports connected with the outer members of the torsion spring devices and projecting forwardly from said devices in lever arm relation thereto; second wheel supports connected with said outer members and projecting rearwardly from said torsion spring devices in lever arm relation thereto; road wheels on said first wheel supports; rail wheels on said second wheel supports; and shifting mechanism effective on said wheel supports through said torsion spring devices and including an actuating lever connected with said coupling means.

3. In a road-rail vehicle, a frame structure, a lateral shaft means extending transversely of said frame structure, support means connected with said frame structure and engaging end and intermediate portions of said shaft means, a pair of tube members disposed in a substantially laterally aligned relation and surrounding said shaft means so as to have the axis of said shaft means as a common axis, a yieldable torque-transmitting medium between said tube members and said shaft means, wheel mounts connected with said tube members adjacent the outer ends of the latter and each comprising a road wheel arm extending away from said common axis on one side thereof and a rail wheel arm extending away from said common axis on the other side thereof, road-type load wheels rotatably mounted on the road wheel arms and constituting a first set of load wheels, rail-type load wheels rotatably mounted on the rail wheel arms and constituting a second set of load wheels, and means effective between said frame structure and said shaft means for maintaining one set of said load wheels in a lowered position in engagement with a traction surface and the other set of load wheels in a relatively elevated position, said tube members being independently rotatable about said shaft means by torsional flexing of said medium such that load wheels of said one set which are located on opposite sides of the vehicle are independently springably movable relative to said frame structure.

4. In a road-rail vehicle, a frame structure, shaft means extending transversely of said frame structure and connected therewith so as to be rockable about its axis, tube members surrounding said shaft means, a yieldable torsion medium between said shaft means and said tube members and resisting relative rotation therebetween, road wheel arms and rail wheel arms connected with said tube members and projecting therefrom on opposite sides of said axis, a set of road wheels rotatably mounted on said road wheel arms, a set of rail wheels rotatably mounted on said rail wheel arms, said road wheel arms and said rail wheel arms being swingable as a unit about said axis by torque transmitted through said torsion medium for engaging one set of said wheels with a traction surface and disengaging the other set of wheels from a traction surface, an actuating lever connected with said shaft means, a nut trunnioned on said lever, a carrier, trunnion means mounting said carrier on said frame structure, a drive screw supported by said carrier for rotary and swinging movements and engaging said nut, and a motor connected with said screw for rotating the same.

5. A road-rail vehicle as defined in claim 4 in which said motor is connected with said screw through shaft means located on the axis of said trunnion means.

6. In a vehicle of the character described, a frame structure having mounting portions spaced apart laterally in a direction transversely of the vehicle, transverse shaft means engaged by said mounting portions, tubular means substantially coaxial with said shaft means, a yieldable torsion medium between said tubular means and said shaft means and resisting relative rotation therebetween, a first pair of arms substantially rigidly connected with said tubular means and projecting therefrom on one side thereof, load wheels on said first pair of arms, a second pair of arms projecting from said tubular means on the other side thereof in an angular relation to said first pair of arms, load wheels on said second pair of arms, means connected with said shaft means for imparting rotation thereto for selectively lifting and lowering the load wheels of said first and second pairs of arms, and means flexibly connecting said second pair of arms with said tubular means for variation of said angular relation.

7. A vehicle as defined in claim 6 in which the load wheels of said second pair of arms have a fully lifted position in engagement with a portion of the vehicle, and in which the flexibility of the flexibly connecting means provides for increase in the angularity between said pairs of arms in response to continued rotation of said shaft means after the engagement of the last-mentioned load wheels with said portion of the vehicle.

8. In a wheeled vehicle, a frame structure, torsion spring means extending transversely of the vehicle and connected with said frame structure, pairs of load wheel arms projecting from said torsion spring means with a predetermined angular relation between the pairs of said arms, sets of load wheels on said pairs of arms, one pair of said arms having a relatively fixed connection with said torsion spring means, hinge means effective between the other pair of said arms and said torsion spring means and defining therebetween a flexible connection which is openable and closable for variation in the angular relation between said pairs of arms, and means effective through said torsion spring means for selectively lifting and lowering said sets of load wheels and for shifting the vehicle load to the lowered set of load wheels, said flexible connection being openable during the lifting of the load wheels of said other pair of arms and being self-closing at least in part by the vehicle load during lowering of the last-mentioned load wheels and the shifting of the vehicle load to the latter wheels.

9. A wheeled vehicle as defined in claim 8 in which said hinge means is located below the axis of said torsion spring means.

10. In a wheeled vehicle, a frame structure, torsion spring means extending transversely of the vehicle and connected with said frame structure, pairs of load wheel arms projecting from said torsion spring means with a predetermined angular relation between the pairs of said arms, sets of load wheels on said pairs of arms, one pair of said arms having a relatively fixed connection with said torsion spring means, hinge means effective between the other pair of said arms and said torsion spring means and defining therebetween a flexible connection which is openable and closable for variation in the angular relation between said pairs of arms, means effective through said torsion spring means for selectively lifting and lowering said sets of load wheels and for shifting the vehicle load to the lowered set of load wheels, the load wheels of said other pair of arms being engageable with said frame structure and said flexible connection being openable in response to such frame engagement by the last-mentioned load wheels, and spring means effective between said frame structure and said other pair of arms for resisting the opening of said flexible connection.

11. In a road-rail vehicle, a frame structure, a pair of laterally spaced wheel mounts each comprising a road wheel arm and a rail wheel arm, a set of road wheels rotatably mounted on the road wheel arms, a set of rail wheels rotatably mounted on the rail wheel arms, connecting means connecting said mounts with said frame structure including a transversely extending torsion spring means providing for a swinging actuation of said mounts as units about a common transverse axis for engaging one set of said wheels with a traction surface and disengaging the other set of wheels from a traction surface, said road wheel arms and said rail wheel arms having recessed complementary adjacent ends embracing said torsion spring means, and means connecting said adjacent ends including hinge means eccentric to said common axis and providing for opening and closing swinging movements of the recessed ends of said road wheel arms relative to the recessed ends of said rail wheel arms during portions of the unitary swinging actuation of said mounts.

12. In a road-rail vehicle, a frame structure having side frame portions and an intermediate frame portion disposed between and spaced from said side frame portions, a pair of substantially aligned torsion spring devices extending transversely of the vehicle and disposed between said side frame portions and said intermediate frame portion, said spring devices each comprising substantially coaxially extending relatively rotatable inner and outer members and yieldable torsion medium elements disposed between said inner and outer members and resisting relative rotation therebetween, a pair of substantially fore and aft wheel arms adjacent each side of the vehicle and comprising a road wheel arm and an associated rail wheel arm, means connecting the adjacent ends of each such pair of associated road wheel and rail wheel arms with one of the coaxial members of one of said spring devices, road wheels rotatably mounted on the road wheel arms, rail wheels rotatably mounted on said rail wheel arms, said arms being swingable for selectively raising said road wheels and lowering said rail wheels and vice versa such that certain selected ones of said wheels when in their lowered position constitute load wheels for supporting the vehicle and vehicle load, and actuating means associated with said intermediate frame portion and connected with the adjacent ends of the other of the coaxial members of said spring devices and operable to cause the swinging of said arms by rotary movement transmitted through the torsion medium elements of said spring devices.

13. A wheeled vehicle as defined in claim 12 in which the torsion medium element of each spring device comprises a sleeve of rubber-like material extending between said inner and outer members for the major portion of the axial length of the latter.

14. A road-rail vehicle as defined in claim 12 in which the adjacent ends of the pairs of associated road wheel and rail wheel arms are attached to the outer members of said spring devices and the adjacent ends of the inner members of said spring devices are connected with said actuating means.

15. A road-rail vehicle as defined in claim 12 in which said actuating means is effective to normally prevent rotation of said others of the coaxial members for maintaining said load wheels in their lowered position, and in which said load wheels are springable relative to said frame structure and substantially independently of each other by flexing of the torsion medium elements of the respective spring devices.

16. In a road-rail vehicle, a frame structure, a lateral shaft means extending transversely of said frame structure, support means connected with said frame structure and engaging end and intermediate portions of said shaft means, a pair of tube members disposed in a substantially laterally aligned relation and surrounding said shaft means so as to have the axis of said shaft means as a common axis, a yieldable torque-transmitting medium between said tube members and said shaft means, wheel mounts connected with said tube members adjacent the outer ends of the latter and each comprising a road wheel arm extending away from said common axis on one side thereof and a rail wheel arm extending away from said common axis on the other side thereof, road-type load wheels rotatably mounted on the road wheel arms and constituting a first set of load wheels, the rail wheel arms having downwardly facing recesses therein, rail-type load wheels fixed on a common axle and constituting a second set of load wheels, journal boxes disposed in said recesses and having said axle rotatable therein, means effective between said frame structure and said shaft means for maintaining one set of said load wheels in a lowered position in engagement with a traction surface and the other set of load wheels in a relatively elevated position, and suspension links swingably connecting said journal boxes with said rail wheel arms and providing for relatively free lateral shifting between said rail-type load wheels and said rail wheel arms when said rail-type load wheels are in their lowered position in engagement with a railway track.

17. In a wheel suspension for a road-rail vehicle having a frame and body structure, transverse shaft means supporting said structure, a pair of road wheel and rail wheel arms on each side of the suspension with the road wheel arm of each such pair extending away from said shaft means on one side of the axis thereof and the rail wheel arm of each such pair extending away from said shaft means on the opposite side of said axis, road wheels mounted on the road wheel arms, rail wheels mounted on the rail wheel arms, means providing for rotation of said shaft means for selectively lifting and lowering the road wheels and rail wheels, and connecting means providing a flexible connection between said shaft means and the arms on one side of said axis and a rigid connection between said shaft means and the arms on the other side of said axis.

18. A wheel suspension as defined in claim 17 in which the road wheel arms have base portions pivotally connected with said shaft means by pivot means offset from the axis of said shaft means and said base portions being openably swingable away from the shaft means in response to rotary movement of said shaft means in the direction for lifting said road wheels.

19. A wheel suspension as defined in claim 17 in which the road wheel arms are pivotally connected with said shaft means for swinging of said road wheel arms relative to said shaft means during rotary movement of the latter in the direction for lifting said road wheels, and wherein a portion of said frame and body structure is engageable by said road wheels during lifting of the latter to cause said relative swinging of the road wheel arms in response to continued rotation of said shaft means after the engagement of said road wheels with said structure.

20. A wheel suspension as defined in claim 17 in which said shaft means is a torsion spring means comprising relatively rotatable outer and inner coaxial shaft members and a yieldable torsion medium therebetween, and wherein said rail wheel arms are rigid with said outer shaft member and said road wheel arms are pivotally connected with said outer shaft member for swinging of the road wheel arms relative to said shaft means in response to rotary movement of said outer shaft member in the direction for lifting said road wheel arms, the last-mentioned rotary movement of said outer shaft member being imparted thereto from said inner shaft member through said torsion medium.

References Cited in the file of this patent

UNITED STATES PATENTS

| | | |
|---|---|---|
| 1,938,049 | Serrano | Dec. 5, 1933 |
| 2,030,311 | Messick | Feb. 11, 1936 |
| 2,039,489 | Messick | May 5, 1936 |
| 2,268,439 | Beebe | Dec. 30, 1941 |
| 2,545,956 | Julien | Mar. 20, 1951 |
| 2,613,954 | Avila | Oct. 14, 1952 |